(12) United States Patent
Reynolds et al.

(10) Patent No.: US 10,527,060 B2
(45) Date of Patent: *Jan. 7, 2020

(54) VARIABLE STATOR VANE ASSEMBLIES AND VARIABLE STATOR VANES THEREOF HAVING A LOCALLY SWEPT LEADING EDGE AND METHODS FOR MINIMIZING ENDWALL LEAKAGE THEREWITH

(71) Applicant: HONEYWELL INTERNATIONAL INC., Morris Plains, NJ (US)

(72) Inventors: Bruce David Reynolds, Chandler, AZ (US); Timothy Gentry, Phoenix, AZ (US); Richard David Conner, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/685,038

(22) Filed: Aug. 24, 2017

(65) Prior Publication Data

US 2018/0094645 A1    Apr. 5, 2018

Related U.S. Application Data

(63) Continuation of application No. 14/485,163, filed on Sep. 12, 2014, now Pat. No. 9,784,285.

(51) Int. Cl.
    *F01D 11/00* (2006.01)
    *F01D 17/16* (2006.01)
    (Continued)

(52) U.S. Cl.
    CPC .......... *F04D 29/544* (2013.01); *F01D 5/141* (2013.01); *F01D 17/162* (2013.01);
    (Continued)

(58) Field of Classification Search
    CPC ........ F01D 5/141; F01D 11/005; F01D 17/16; F01D 17/162; F01D 17/165;
    (Continued)

(56) References Cited

U.S. PATENT DOCUMENTS

| 6,129,512 A * | 10/2000 | Agram | .................. | F01D 17/162 415/160 |
|---|---|---|---|---|
| 6,283,705 B1 | 9/2001 | Rice | | |

(Continued)

FOREIGN PATENT DOCUMENTS

| EP | 1980720 A2 | 10/2008 |
|---|---|---|
| EP | 1980721 A2 | 10/2008 |
| EP | 2620602 A2 | 7/2013 |

OTHER PUBLICATIONS

Bianchi et al.; A Critical Review of Passive Noise Control Techniques in Industrial Fans; Journal of Engineering for Gas Turbines and Power Apr. 2014, vol. 136 / 044001-1 Copyright VC 2014 by ASME.

(Continued)

*Primary Examiner* — Woody A Lee, Jr.
*Assistant Examiner* — Christopher R Legendre
(74) *Attorney, Agent, or Firm* — Lorenz & Kopf, LLP

(57) ABSTRACT

Variable stator vane assemblies and stator vanes thereof having a local swept leading edge are provided. The variable stator vane comprises an airfoil disposed between spaced apart inner and outer buttons centered about a rotational axis. The inner and outer buttons each have a button forward edge portion. The airfoil includes leading and trailing edges, pressure and suction sides, and a root and a tip. The leading edge, at least a portion of which extends forward of the buttons, includes a local forward sweep at the root, thereby forming a locally swept root of the leading edge thereat. The button forward edge portion of the inner button is substantially vertically aligned with the locally swept leading edge (Continued)

root. Methods are also provided for minimizing endwall leakage in the variable stator vane assembly using the same.

14 Claims, 9 Drawing Sheets

(51) Int. Cl.
*F01D 5/14* (2006.01)
*F04D 29/54* (2006.01)
*F04D 29/56* (2006.01)

(52) U.S. Cl.
CPC .......... *F04D 29/563* (2013.01); *F01D 11/005* (2013.01); *F05D 2240/121* (2013.01); *F05D 2250/70* (2013.01); *Y02T 50/673* (2013.01)

(58) Field of Classification Search
CPC ...... F04D 29/544; F04D 29/56; F04D 29/563; F04D 29/566; F05D 2240/121
See application file for complete search history.

(56) References Cited

U.S. PATENT DOCUMENTS

| | | | |
|---|---|---|---|
| 6,435,821 | B1 | 8/2002 | Nicolson |
| 7,112,040 | B2 | 9/2006 | Debeneix |
| 7,806,652 | B2 | 10/2010 | Major |
| 7,980,815 | B2 | 7/2011 | Cloarec |
| 8,123,471 | B2 | 2/2012 | Mielke et al. |
| 8,491,260 | B2 | 7/2013 | Dutka |
| 8,517,677 | B2 | 8/2013 | Wood et al. |
| 9,353,643 | B2 | 5/2016 | Major |
| 9,410,443 | B2 | 8/2016 | Dube |
| 9,784,285 | B2 * | 10/2017 | Reynolds ............... F01D 5/141 |
| 2005/0175445 | A1 | 8/2005 | Lejars et al. |
| 2009/0317241 | A1 | 12/2009 | Major |
| 2010/0266389 | A1 | 10/2010 | Cloarec |
| 2013/0243580 | A1 | 9/2013 | Hayford et al. |
| 2016/0076548 | A1 | 3/2016 | Reynolds |

OTHER PUBLICATIONS

Extended EP search report for Application No. 15183982.610 dated Feb. 22, 2016.

* cited by examiner

VARIABLE STATOR VANE ASSEMBLIES AND VARIABLE STATOR VANES THEREOF HAVING A LOCALLY SWEPT LEADING EDGE AND METHODS FOR MINIMIZING ENDWALL LEAKAGE THEREWITH

CROSS-REFERENCE TO RELATED APPLICATION

This application is a continuation of U.S. patent application Ser. No. 14/485,163 filed on Sep. 12, 2014. The relevant disclosure of the above application is incorporated herein by reference.

TECHNICAL FIELD

The present invention generally relates to aircraft gas turbine engines, and more particularly relates to variable stator vane assemblies and stator vanes thereof having a locally swept leading edge and methods for minimizing endwall leakage therewith.

BACKGROUND

Non-rotating or stationary variable stator vanes are used in compressors and fans and in some turbines of aircraft gas turbine engines. In the gas turbine engine, a shaft drives a central drum, retained by bearings, which has a number of annular airfoil rows attached usually in pairs, one rotating and one stationary attached to a stationary casing. The pair of rotating and stationary annular airfoil rows is called a stage. The rotating airfoils, also known as blades or rotors (herein "rotor blades"), accelerate the fluid. The annular row of stationary airfoils, also known as stators or vanes can either be completely fixed within the casing ("fixed stator vanes") or able to rotate about a radial or near radial axis to change the angle with which incoming axially flowing fluid intersects the leading edge of the airfoils ("variable stator vanes"). The fixed and variable stator vanes convert the increased rotational kinetic energy into static pressure through diffusion and redirect the flow direction of the fluid (indicated by arrow A in FIG. 1A), preparing it for the rotor blades of the next stage or directing the flow into a downstream duct.

Generally, as schematically depicted in FIGS. 1A and 1B, conventional variable stator vanes 2 in variable stator vane assemblies 4 have stems 6 through their rotational axis 8 that penetrate a hub 10 and the casing (also known as a shroud 12 (for example, of a compressor 14 (partially shown in FIG. 1A))), allowing the vanes 2 to be rotated using an actuation mechanism. The airfoil 16 of each variable stator vane 2 is disposed between spaced apart inner and outer buttons 18 and 20 of material centered about the rotational axis 8. The airfoil 16 of the conventional variable stator vane 2 includes a leading edge 22 and a trailing edge 24, a root 26 and a tip 28. The leading edge 22 of the depicted airfoil of the conventional variable stator vane 2 includes a leading edge aft sweep (encircled region "A" in FIGS. 1A and 1B) (see, also, the stippling in FIG. 5B) at the root 26 near the hub 10 (also referred to herein as "an inner endwall") in a "hub region" and a leading edge forward sweep (encircled region "B") at the tip 28 near the shroud 12 (also referred to herein as "an outer endwall") in a "shroud region". The airfoil 16 may alternatively include a neutral sweep (not shown) at the root 26 near the hub or at the tip 28 near the shroud.

The leading edge aft or neutral sweep at the root in the hub region results in endwall gaps 30a and 30c and the leading edge forward or neutral sweep at the tip in the shroud region results in endwall gaps 30b and 30d (FIG. 1B) existing between the vane and the endwalls (the hub and shroud) of the flow passageway (more particularly between the shroud and the airfoil tip ("outer endwall gaps") and between the hub and the airfoil root ("inner endwall gaps")). Such endwall gaps are defined both forward ("leading edge inner and outer endwall gaps") 30a and 30b and aft ("trailing edge inner and outer endwall gaps") 30c and 30d of the inner and outer buttons 18 and 20 (i.e., the aft swept leading edge at the root of the airfoil and the forward swept leading edge at the tip of the airfoil extend beyond a button forward edge portion of the inner and outer buttons respectively). The rotational axis and the inner and outer buttons centered thereabout may be positioned to balance the size of the leading edge inner and outer endwall gaps with the size of the trailing edge inner and outer endwall gaps, for acceptable aerodynamic and mechanical performance Endwall gap clearance levels are set sufficiently large to avoid contact between the rotated variable stator vane and the shroud and hub. However, as there is a large pressure gradient between the pressure and suction sides of the vane, leakage flow through the endwall gaps 30a-30d between the vanes and the endwalls in the flow passageway is driven across these endwall gaps, resulting in reduced fluid turning and higher aerodynamic loss at the endwalls. Aerodynamic losses are generated as the flow leaks through the inner and outer endwall gaps, especially under the leading edge inner and outer endwall gaps 30a and 30b where the aerodynamic loadings are largest. This leakage flow also causes flow non-uniformities (i.e. wakes) at the adjacent rotor blades 42 in the compressor 14, creating additional downstream losses and exciting these blades and causing potentially damaging vibrations therein because of disturbance of the flowfield about the vanes 2 and blades 42. Additionally, the rotor blades 42 of the upstream and downstream rotors provide a vane excitation source causing vibrations that may break off the corners of the aft swept leading edge, the forward swept leading edge, or both (so-called "corner vibration modes").

Attempts to reduce leakage when using conventional variable stator vanes with an aft swept leading edge at the root and a forward swept leading edge at the tip have included moving the rotational axis and/or inner and outer buttons completely forward such that the leading edge of the airfoil at the root and tip are substantially coextensive with the button forward edge portion. While such complete forward movement of the rotational axis and/or outer and inner buttons substantially eliminates the leading edge endwall gaps, such movement undesirably causes the trailing edge 24 of the vane to be more unsupported (overhung) and increases the trailing edge inner and outer endwall gap 30c and 30d size and accompanying leakage flow, resulting in increased mechanical risk and increased aerodynamic losses. Enlargement and shaping of the inner and outer buttons 18 and 20 to minimize endwall leakage has also been attempted with spatial limits due to the adjacent vanes, but not without disadvantage.

Thus, it is desirable to provide variable stator vane assemblies and variable stator vanes thereof having a local swept leading edge and methods for minimizing endwall leakage therewith. Endwall leakage is minimized without increasing the trailing edge inner and outer endwall gap size, thereby reducing aerodynamic losses, improving mechanical performance and robustness, and improving compressor efficiency.

BRIEF SUMMARY

Variable stator vanes are provided. In accordance with one exemplary embodiment, the variable stator vane comprises an airfoil disposed between spaced apart inner and outer buttons centered about a rotational axis. The inner and outer buttons each have a button forward edge portion. The airfoil includes leading and trailing edges, pressure and suction sides, and a root and a tip. The leading edge includes a local forward sweep at the root, a local aft sweep at the tip, or both, thereby forming a locally swept leading edge thereat. The button forward edge portion of one or both of the inner and outer buttons is substantially coextensive with the locally swept leading edge thereat.

Variable stator vane assemblies are provided in accordance with yet another exemplary embodiment of the present invention. The variable stator vane assembly comprises an inner and an outer button spaced apart and centered about a rotational axis and at least one annular row of variable stator vanes. Each of the inner and outer buttons has an edge circumscribed about the rotational axis at a button radius. The edge comprises a button forward edge portion and a button aft edge portion. Each variable stator vane in the at least one annular row of variable stator vanes comprises an airfoil disposed between the spaced apart inner and outer buttons. The airfoil includes leading and trailing edges, pressure and suction sides, and a root and a tip. The leading edge of the airfoil includes a local forward sweep at the root, a local aft sweep at the tip, or both, thereby forming a locally swept leading edge thereat that is substantially coextensive with the button forward edge portion of one or both of the inner and outer buttons.

Methods for minimizing endwall leakage in a variable stator vane assembly are provided in accordance with yet another exemplary embodiment of the present invention. The method comprises providing a variable stator vane for the variable stator vane assembly and disposing the variable stator vane between spaced apart inner and outer buttons of the variable stator vane assembly. The inner and outer buttons are centered about a rotational axis. The variable stator vane comprises an airfoil including leading and trailing edges, pressure and suction sides, and a root and a tip. The leading edge includes a local forward sweep at the root with a sweep offset of −15° or less, a local aft sweep at the tip with the sweep offset of 15° or greater, or both, thereby forming a locally swept leading edge thereat. Each of the inner and outer buttons has a button forward edge portion. The variable stator vane is configured such that, when the variable stator vane is disposed between the spaced apart inner and outer buttons, the button forward edge portion of one or both of the inner and outer buttons is substantially coextensive with the locally swept leading edge of the airfoil.

According to various embodiments, variable stator vanes are provided. In accordance with one exemplary embodiment, the variable stator vane comprises an airfoil disposed between spaced apart inner and outer buttons centered about a rotational axis. The inner and outer buttons each have a button forward edge portion. The airfoil includes leading and trailing edges, pressure and suction sides, and a root and a tip. The leading edge, at least a portion of which extends forward of the buttons, includes a local forward sweep at the root, thereby forming a locally swept root of the leading edge thereat. The button forward edge portion of the inner button is substantially vertically aligned with the locally swept leading edge root thereat.

Variable stator vane assemblies are provided in accordance with yet another exemplary embodiment of the present invention. The variable stator vane assembly comprises an inner and an outer button spaced apart and centered about a rotational axis and at least one annular row of variable stator vanes. Each of the inner and outer buttons has an edge circumscribed about the rotational axis at a button radius. The edge comprises a button forward edge portion and a button aft edge portion. Each variable stator vane in the at least one annular row of variable stator vanes comprises an airfoil disposed between the spaced apart inner and outer buttons. The airfoil includes leading and trailing edges, pressure and suction sides, and a root and a tip. The leading edge, at least a portion of which extends forward of the buttons, of the airfoil includes a local forward sweep at the root, thereby forming a locally swept root of the leading edge and the button forward edge portion of the inner button is substantially vertically aligned with the locally swept leading edge root thereat.

Methods for minimizing endwall leakage in a variable stator vane assembly are provided in accordance with yet another exemplary embodiment of the present invention. The method comprises providing a variable stator vane for the variable stator vane assembly and disposing the variable stator vane between spaced apart inner and outer buttons of the variable stator vane assembly. The inner and outer buttons are centered about a rotational axis. The variable stator vane comprises an airfoil including leading and trailing edges, pressure and suction sides, and a root and a tip. The leading edge includes a local forward sweep at the root with a sweep offset of −15° or less, thereby forming a locally swept root of the leading edge to minimize leading edge endwall gaps at the root. Each of the inner and outer buttons has a button forward edge portion. The variable stator vane is configured such that, when the variable stator vane is disposed between the spaced apart inner and outer buttons, the button forward edge portion of the inner button is substantially vertically aligned with the locally swept leading edge at the root.

Furthermore, other desirable features and characteristics of the variable stator vanes, variable stator vane assemblies and methods for minimizing endwall leakage will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 4A:
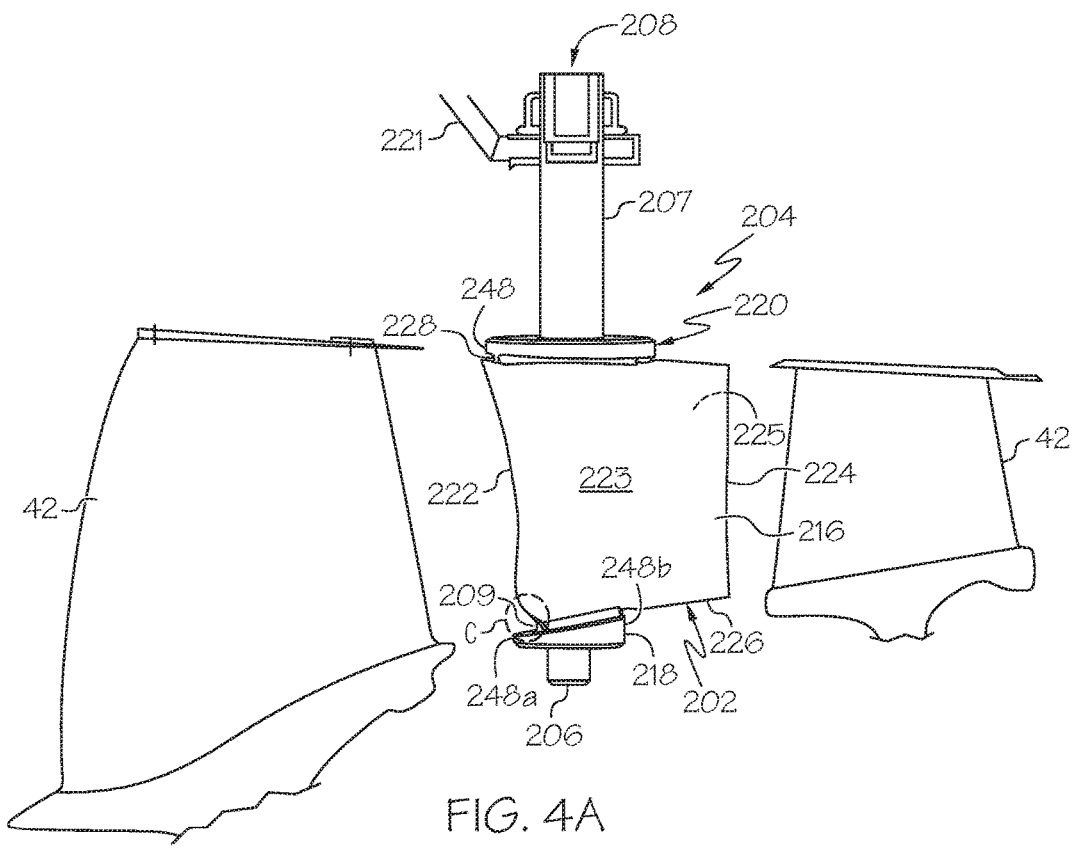
FIG. 4A is a meridional view of a portion of one of the compressors of FIGS. 2 and 3 including a variable axial stator assembly including a variable stator vane having an airfoil disposed between spaced apart inner and outer buttons centered about a rotational axis, each of the inner and outer buttons having a button forward edge portion, a leading edge of the airfoil having a local forward sweep (encircled region C) at a root in a hub region of one of the compressors of FIG. 3 and the button forward edge portion of the inner button substantially coextensive with the locally forward swept leading edge, in accordance with exemplary embodiments of the present invention.
Figure 4B:
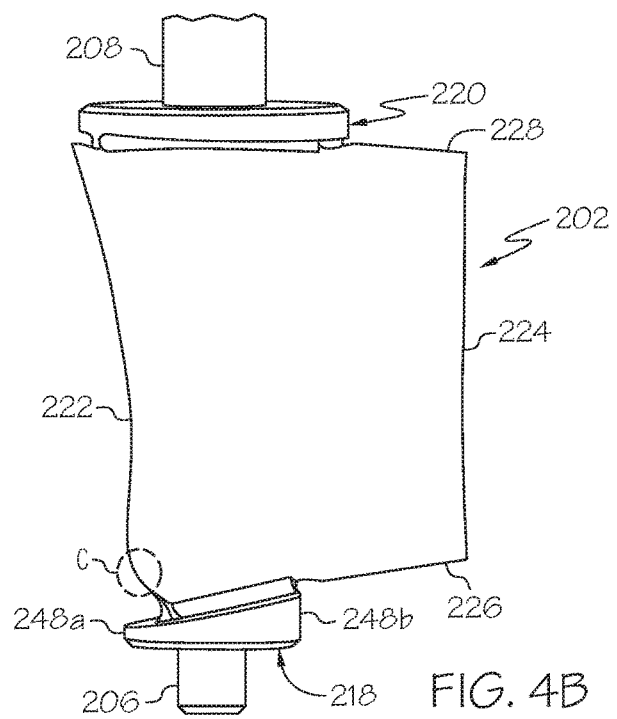
FIG. 4B is an enlarged close-up view of the variable axial stator assembly of FIG. 4A.
Figure 5B:
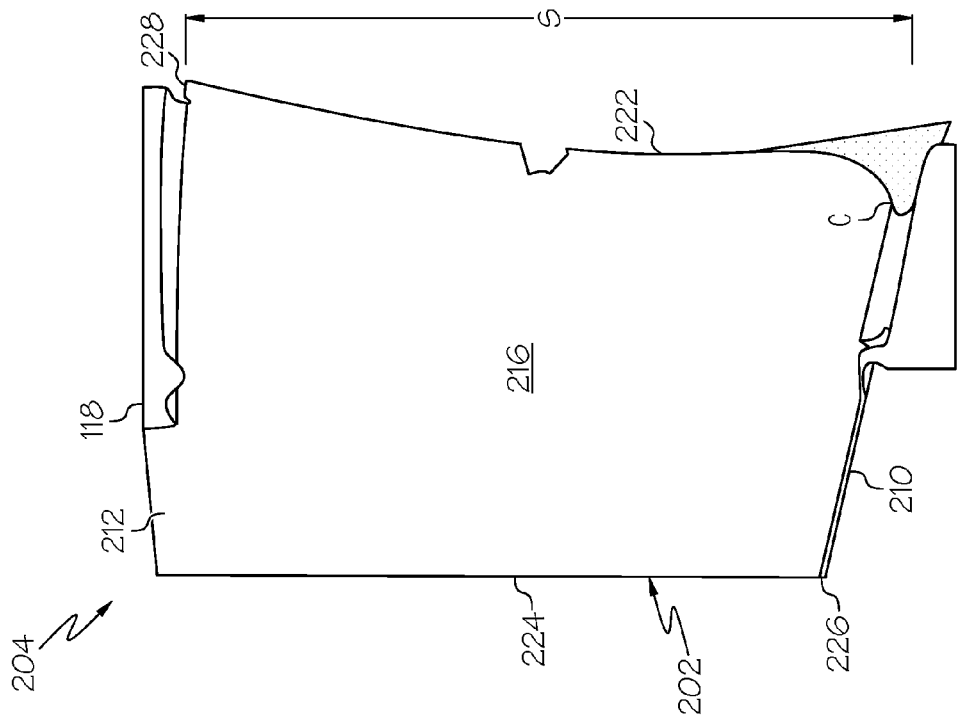
FIG. 5B is a meridional view of a portion of the variable axial stator assembly of FIG. 5A according to exemplary embodiments of the present invention, the conventional aft swept leading edge at the root (as depicted in the conventional variable axial stator assembly of FIGS. 1A and 1B) shown by stippling for comparison.
Figure 5A:
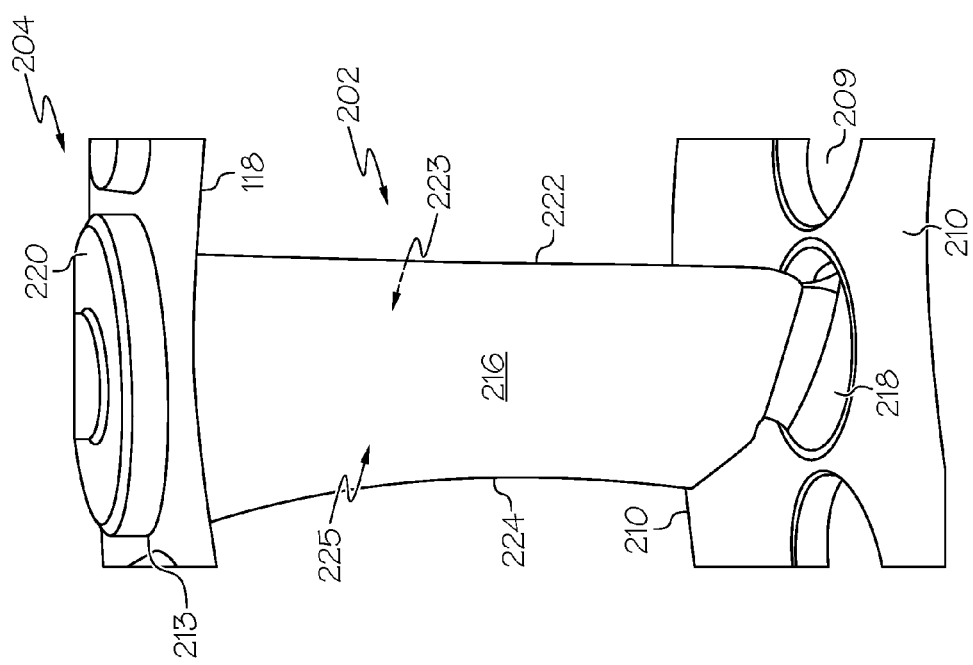
FIG. 5A is a forward looking aft three-dimensional view of a variable axial stator assembly including a variable stator vane having an airfoil with a local forward swept leading edge at the root in the hub region according to exemplary embodiments of the present invention.
Figure 6A:
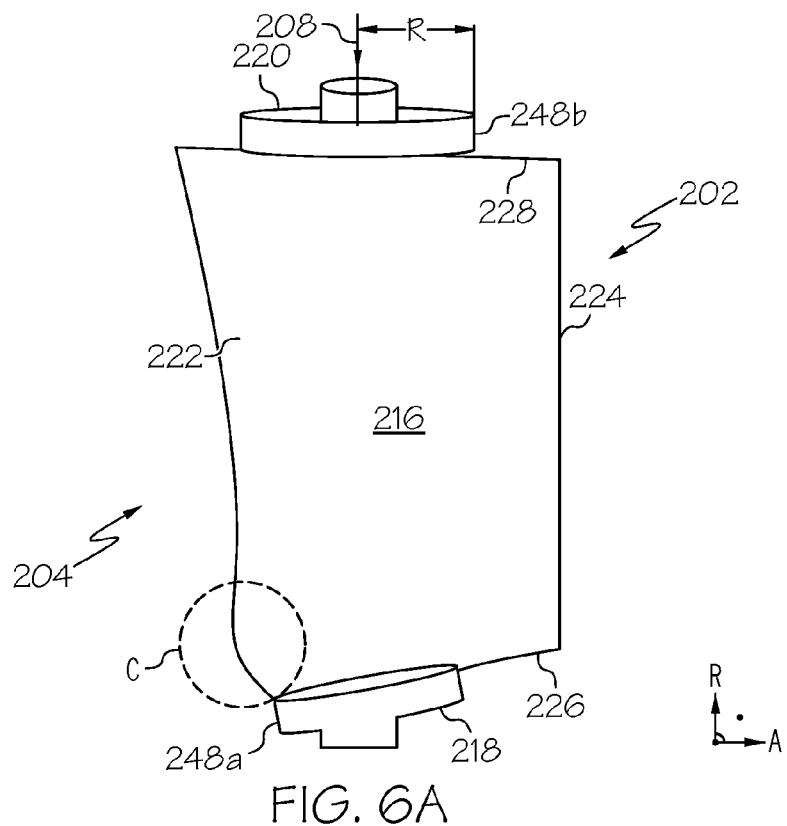
FIG. 6A is a meridional view of the stator vane of FIGS. 5A and 5B with the local forward swept leading edge at the airfoil root in the hub region, according to exemplary embodiments of the present invention.

Various embodiments are directed to variable stator vane assemblies and variable stator vanes thereof having a local swept leading edge. A variable stator vane has an airfoil disposed between spaced apart inner and outer buttons centered about a rotational axis. The airfoil includes leading and trailing edges, pressure and suction sides, and a root and a tip. The buttons are positioned based on a balance of aerodynamic and mechanical design (i.e., not in a completely forward position where the leading edge of the airfoil in the hub and shroud regions is substantially coextensive with a button forward edge portion as previously described). In accordance with exemplary embodiments of the present invention, the leading edge of the airfoil includes a local forward sweep at the root in a hub region of a compressor, a local aft sweep at the tip in a shroud region thereof, or both, that is substantially coextensive with a button forward edge portion of one or both of the inner and outer buttons, thereby substantially eliminating leading edge endwall gaps between the variable stator vane and the leading edge of one or both of the inner and outer endwalls (also referred to herein respectively as the hub and the shroud). As used herein, the term "blade span" refers to the geometry of the airfoil that is defined in part by a span dimension S (see, e.g., FIG. 5B) extending radially from the root to the tip. Aerodynamic "sweep" is a conventional parameter represented by a sweep angle which is a function of the direction of incoming air and the orientation of the airfoil leading edge in the axial, radial, and circumferential or tangential directions. A forward sweep is denoted by a negative value for the sweep angle. A neutral sweep has zero sweep angle. An aft (or rearward) sweep is denoted by a positive value for the sweep angle. As used herein, the term "sweep offset" is defined as the change or difference in leading edge sweep angle at 0% blade span at the root relative to 25% blade span and the change or difference in leading edge sweep angle at 100% blade span at the tip relative to 75% blade span. The term "substantially coextensive" as used herein refers to the interface between the locally swept leading edge and the button forward edge portion. The term "substantially coextensive" includes both a locally swept leading edge that is vertically aligned with the button forward edge portion (such as hereinafter depicted in FIGS. 6A through 6C) and a locally swept leading edge that may be substantially vertically aligned with the button forward edge portion to permit manufacture, such as the positioning of a fillet at the hub as depicted in FIGS. 4A and 4B.

By substantially eliminating one or both of the inner and outer leading edge endwall gaps, leading edge endwall leakage is substantially eliminated where loading is heaviest and flowfield disturbances between the vanes and the endwalls are avoided. As a result, aerodynamic losses are reduced and compressor efficiency is improved. The rotational axis and inner and outer buttons in the variable stator vane assembly may also be maintained in their optimum mechanical position (i.e., not in a completely forward position) that balances the variable stator vane leading and trailing edges for improved mechanical performance and robustness of the variable stator vane. The rotational axis and inner and outer buttons may be positioned in a neutral position, slightly forward, or slightly aft position relative to the mid-chord position of the airfoil. The improvement in mechanical performance balances and reduces the risk of leading edge and trailing edge corner vibration modes experienced by conventional variable stator vanes having the aft or neutral swept leading edge at the root and the forward or neutral swept leading edge at the tip. The leading edge corners (at the root and tip) of the variable stator vane according to exemplary embodiments of the present invention as hereinafter described may also be configured with a local leading edge sweep at the root and tip to increase stiffness and further reduce risk from the corner vibration modes.

Figure 2:
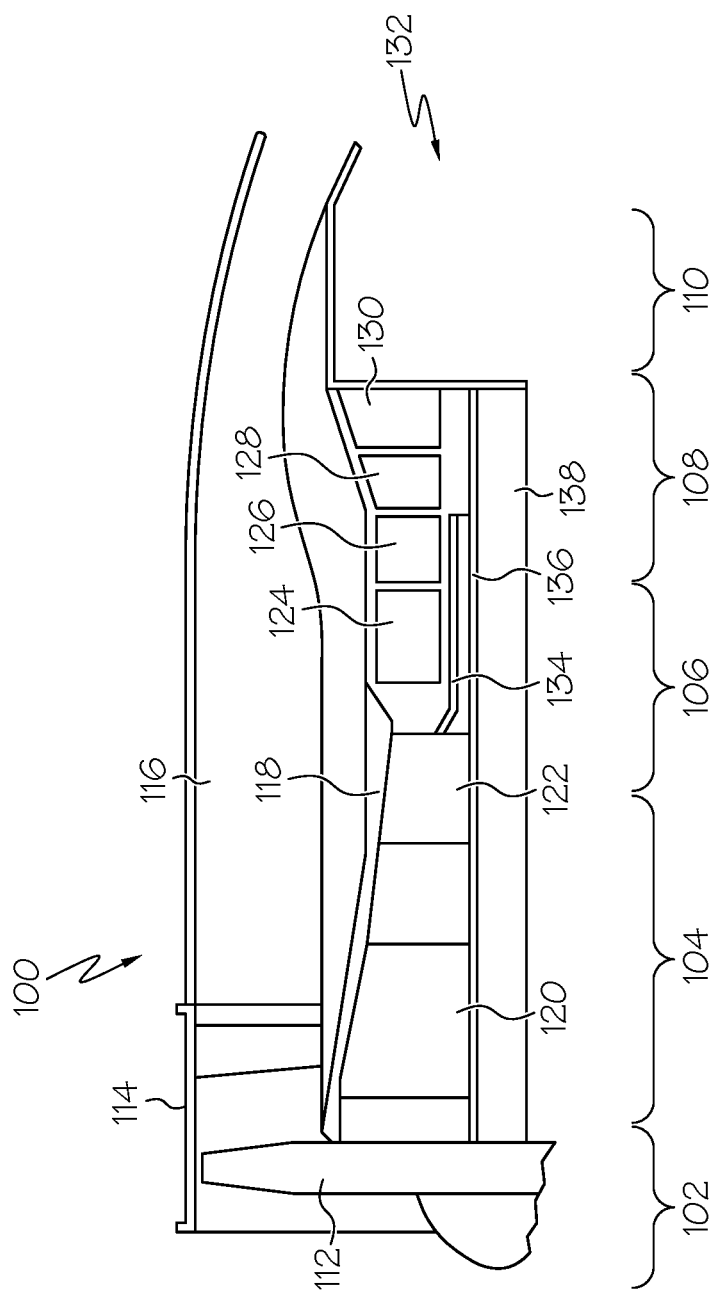
FIG. 2 is a cross-sectional view of an exemplary gas turbine engine including a fan, a low-pressure (LP) compressor (or intermediate-pressure (IP) compressor), and a high-pressure (HP) compressor.
Figure 3:
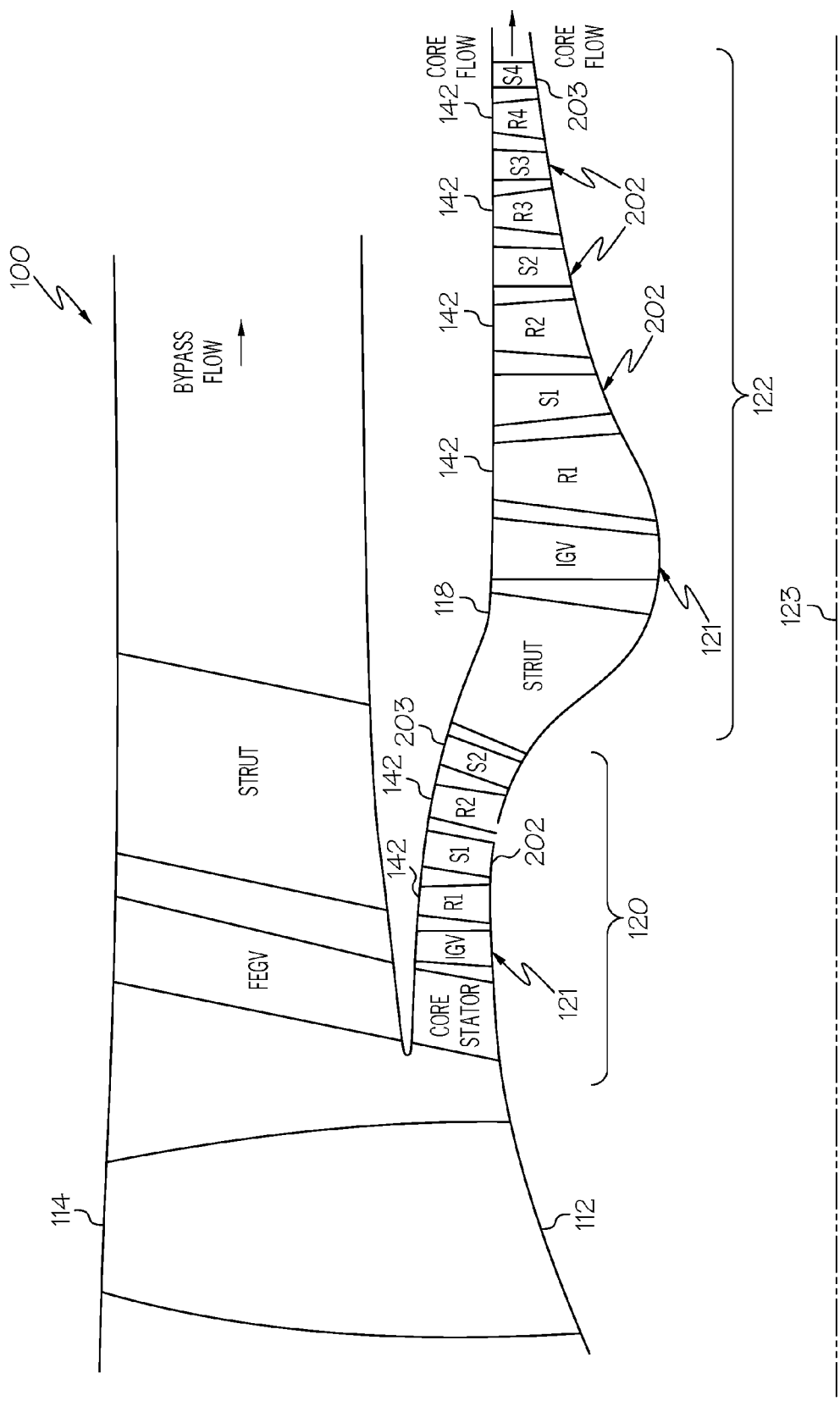
FIG. 3 is a meridional sectional view through a portion of the fan, the LP compressor (or intermediate-pressure (IP) compressor), and the HP compressor of the exemplary gas turbine engine of FIG. 2.

FIG. 2 is a cross-sectional view of an exemplary gas turbine engine 100. The gas turbine engine 100 includes a fan section 102, a compressor section 104, a combustion section 106, a turbine section 108, and an exhaust section 110. The fan section includes a fan 112 mounted in a fan casing 114. The fan 112 induces air from the surrounding environment into the engine and passes a fraction of this air toward the compressor section 104. The compressor section 104 includes at least one compressor and, in the depicted embodiment, includes a low-pressure (LP) compressor 120 (may also be referred to as an intermediate-pressure (IP) compressor) and a high-pressure (HP) compressor 122. The low pressure compressor 120 raises the pressure of the air directed into it from the fan and directs the compressed air into the high-pressure compressor 122. The LP compressor and the HP compressor may be axi-symmetrical about a longitudinal centerline axis 123 (FIG. 3). The LP and HP compressors are mounted in a compressor casing 118 (hereinafter referred to as a shroud 118).

Still referring to FIG. 2, the combustion section 106 of gas turbine engine 100 includes a combustor 124 in which the high pressure air from the HP compressor 122 is mixed with fuel and combusted to generate a combustion mixture of air and fuel. The combustion mixture is then directed into the turbine section 108. The turbine section 108 includes a number of turbines disposed in axial flow series. FIG. 2 depicts a high pressure turbine 126, an intermediate pressure turbine 128, and a low pressure turbine 130. While three turbines are depicted, it is to be understood that any number of turbines may be included according to design specifics. For example, a propulsion gas turbine engine may comprise only a high pressure turbine and a low pressure turbine. The combustion mixture from the combustion section 106 expands through each turbine 126, 128, 130, causing them to rotate. As the turbines 126, 128, 130 rotate, each respectively drives equipment in the gas turbine engine 100 via concentrically disposed shafts or spools 134, 136, 138. The combustion mixture is then exhausted through the exhaust section 110.

FIG. 3 is a meridional sectional view through a portion of the fan 112, the LP compressor 120, and the HP compressor 122 of the exemplary gas turbine engine of FIG. 2. The LP and HP compressors 120 and 122 depicted in FIG. 3 each include one or more compressor stages spaced in a circumferential direction around the longitudinal centerline axis 123. Each compressor stage has a compressor rotor 142 (e.g., rotors R1 and R2 in LP compressor 120 and rotors R1, R2, R3, and R4 in HP compressor 122). Cooperating with each compressor rotor 142 is a corresponding variable stator vane 202 or fixed stator vane 203. A fixed stator vane 203 may be used in the compressor stage if there is no requirement to adjust downstream stage performance or there are no subsequent compressor stages in the respective compressor. For example, the LP compressor 120 depicted in FIG. 3 has two compressor stages, stage 1 and stage 2. LP compressor stage 1 includes rotor R1/142 and corresponding variable stator vanes IGV (inlet guide vane) 121 and S1/202. LP compressor stage 2 includes rotor R2/142 and corresponding fixed stator vane S2/203. There are no more compressor stages downstream of fixed stator vane S2/203 in the depicted LP compressor of FIG. 3. HP compressor stage 1 depicted in FIG. 3 includes IGV (inlet guide vane) 121, rotor R1/142, and corresponding variable stator vane S1/202, HP compressor stage 2 includes rotor R2/142 and corresponding variable stator vane S2/202, HP compressor stage 3 includes rotor R3/142 and corresponding variable stator vane S3/202, and HP compressor stage 4 includes rotor R4/142 and corresponding fixed stator vane S4/203. In the depicted embodiment, there are either no requirements to adjust the S4/203 downstream compressor stage inlet flowfield or there are no more compressor stages downstream of fixed stator vane S4/203. While FIG. 3 depicts a fan 112 with a single fan stage, a LP compressor 120 with two compressor stages and an HP compressor 122 with four compressor stages, it is to be understood that the number of fan stages and compressor stages may vary from that depicted, with a greater number of fan stages, and fewer or greater LP and HP compressor stages. Though the exemplary embodiment of the variable stator vanes disclosed herein is for a low pressure compressor and a high pressure compressor, the variable stator vanes according to exemplary embodiments may be used in other compressors and in fan and turbine sections of a gas turbine engine.

Referring now specifically to FIGS. 4A through 6C, in accordance with exemplary embodiments of the present invention, the variable stator vanes 202 are included in variable stator vane assemblies 204 supported by the compressor casing 118 (also known as the shroud). Each variable stator vane assembly 204 includes a plurality of the variable stator vanes 202. Each variable stator vane 202 is pivotable or rotatable about a rotational axis 208. Each variable stator vane 202 has an airfoil 216 disposed between spaced apart inner and outer buttons 218 and 220 centered about the rotational axis 208. An inner stem 206 extends inwardly from the inner button 218 and an outer stem 207 extends outwardly from the outer button 220. The inner and outer stems 206 and 207 are rotatably supported with the inner and outer buttons respectively in the hub 210 and shroud 118. The inner stem 206 and inner button 218 are rotatably disposed through the hub 210, the inner button mounted in an inner opening 209 in the compressor hub 210 (FIG. 5A). The hub 210 is spaced inwardly of the shroud 118. The outer stem 207 and outer button 220 are rotatably disposed through the shroud 118, the outer button 220 mounted in an outer opening 213 in the shroud 118. A lever arm 221 (FIG. 4A) extends from the outer stem 207 and is linked to an actuation ring (not shown) for rotating or pivoting and setting the flow angle of the variable stator vanes 202.

The circular inner and outer buttons 218 and 220 are rotatably disposed in the inner and outer circular openings 209 and 213 in the hub 210 and in the shroud 118 respectively. As noted previously, each airfoil 216 has an airfoil leading edge 222 upstream of an airfoil trailing edge 224, pressure and suction sides 223 and 225, a root 226 and a tip 228. The circular inner and outer buttons 218 and 220 each have a front face (obverse) 244, a back face (reverse) 246 (FIG. 6C), and an edge 248 between the front and back faces. The edge 248 encircles the perimeter of each button and is circumscribed about the rotational axis at a button radius R. The portion of the edge that faces the incoming air is referred to herein as a button forward edge portion 248a (e.g., FIG. 6B). The button forward edge portion 248a faces in the same circumferential direction as the airfoil leading edge 222. The portion of the edge that faces away from the incoming air is referred to herein as a button aft edge portion 248b (e.g., FIG. 6B). The button aft edge portion faces in the same circumferential direction as the airfoil trailing edge 224. The button forward edge portion 248a is upstream of the button aft edge portion 248b. Leading and trailing edges refer to the airfoils and forward and aft edge portions refer to the buttons in the context of airflow direction. The other portions of the button edge 248 generally correspond to and face in the same circumferential directions as the airfoil pressure and suction sides 223 and 225 respectively.

Referring now specifically to FIGS. 4A through 6A and 6C, in accordance with exemplary embodiments of the present invention, the leading edge 222 of one or more of the airfoils 216 in the variable stator vane assembly 204 includes a local leading edge forward sweep at the root (encircled region C) forming a local forward swept leading edge thereat. The local leading edge forward sweep (encircled region C) at the airfoil root 226 is near the hub 210, in a "hub region". The local leading edge forward sweep at the airfoil root near the hub may have a sweep offset of −15° or less, i.e., the difference in sweep angle at 0% blade span relative to 25% blade span may be −15° or less (more negative) (e.g., the local leading edge forward sweep of the variable stator vane of FIGS. 4A through 6A and 6C has an exemplary −52° sweep offset (the change or difference in the leading edge sweep angle near the hub from 8° at 25% blade span to −44° at 0% blade span as depicted in FIG. 7)). When the local leading edge forward sweep is at the root 226 near the hub, the button forward edge portion 248a of the inner button 218 is substantially coextensive with the local forward swept leading edge. As a result, the button forward edge portion 248a of the inner button 218 substantially covers the leading edge of the variable stator vane 202 at the root, thereby substantially eliminating a leading edge inner endwall gap (as previously described) between the airfoil root 226 and the hub 210.

Figure 1A:
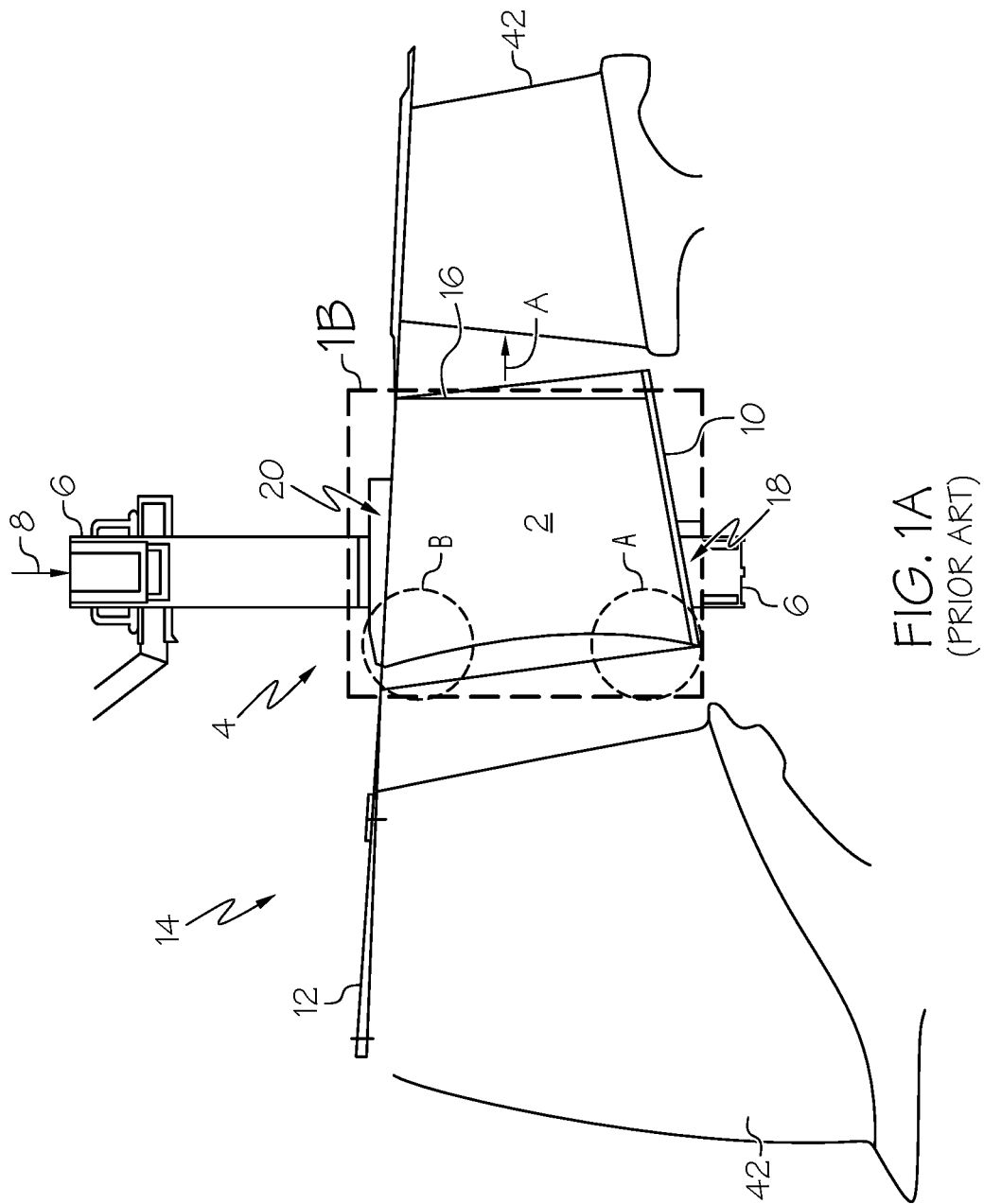
FIG. 1A is a meridional view of a portion of a gas turbine engine compressor including a conventional variable axial stator assembly disposed between two rotors, the variable axial stator assembly including a conventional variable stator vane having an airfoil with a leading edge including a local aft sweep at the root in a hub region (encircled region A) and a local forward sweep at the tip in a shroud region (encircled region B) defining leading edge inner and outer endwall gaps and trailing edge inner and outer endwall gaps thereat.
Figure 1B:
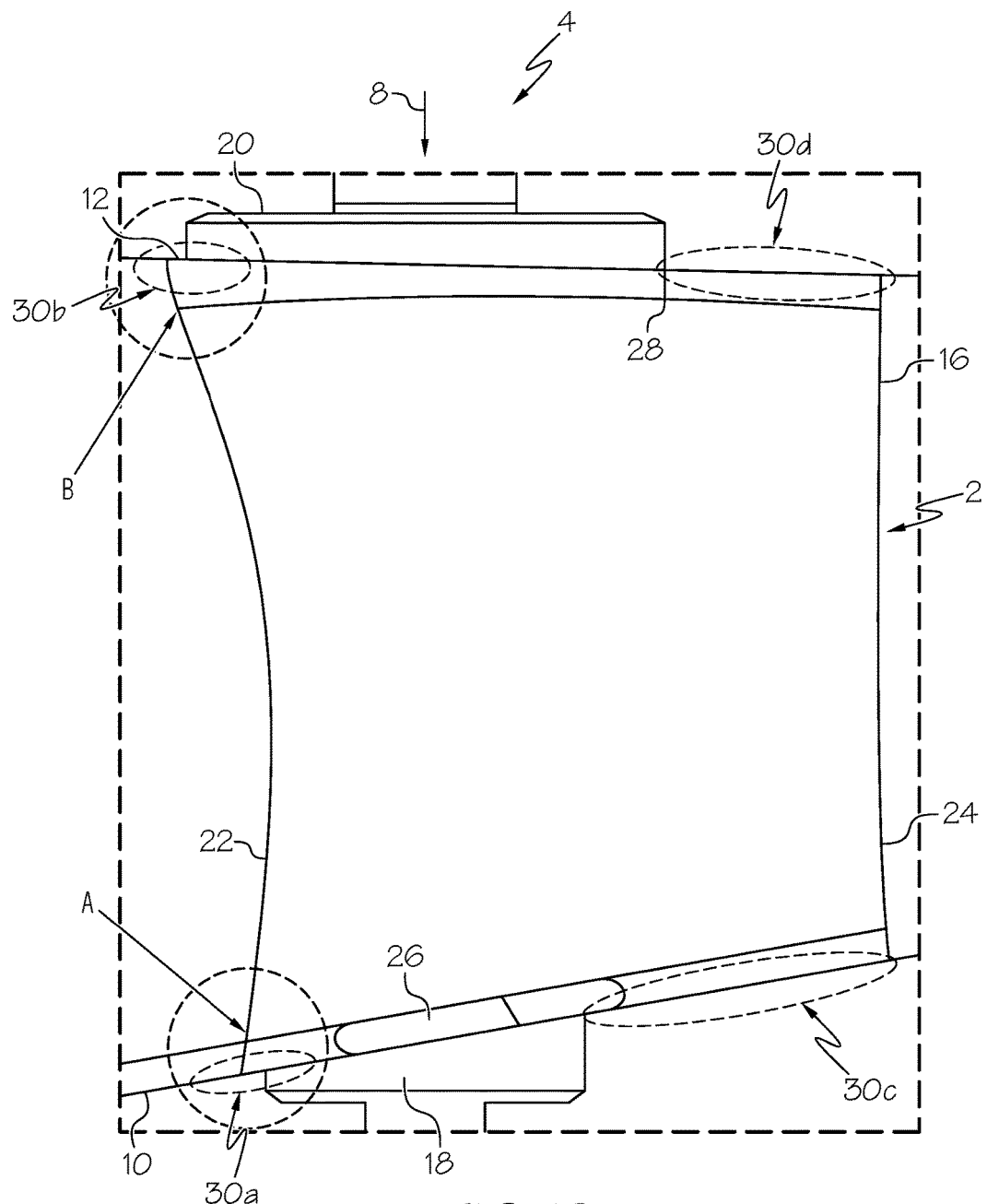
FIG. 1B is an enlarged close-up view of the conventional variable axial stator assembly of FIG. 1A, depicting the airfoil disposed between spaced apart inner and outer buttons centered about a rotational axis.

FIG. 7 compares the sweep angles of the variable stator vane of FIGS. 4A through 6A according to exemplary embodiments with a conventional variable stator vane having a leading edge aft sweep at the root in the hub region (the conventional variable stator vane of FIGS. 1A and 1B includes the leading edge aft sweep (encircled region A) at the root in the hub region). In the depicted embodiment, the sweep angles of the variable stator vane are between about −44° at the root and increasing in sweep angle toward the tip, with an exemplary −52° sweep offset as noted above. The sweep angle remains negative for almost the entire blade span. In contrast, the conventional variable stator vane having the leading edge aft sweep at the root has substantially no sweep offset (i.e., substantially no change in sweep angle at 0% blade span relative to 25% blade span) and transitions to a leading edge forward sweep toward the tip.

Figure 6B:
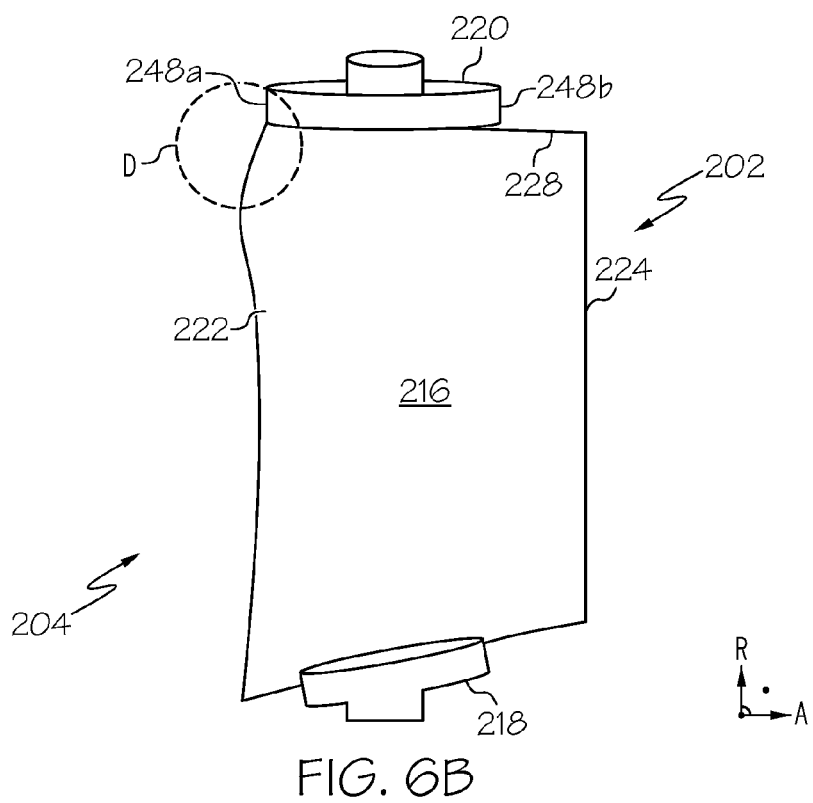
FIG. 6B is a meridional view of a variable stator vane with a local aft swept leading edge at the airfoil tip in the shroud region according to additional exemplary embodiments of the present invention.
Figure 6C:
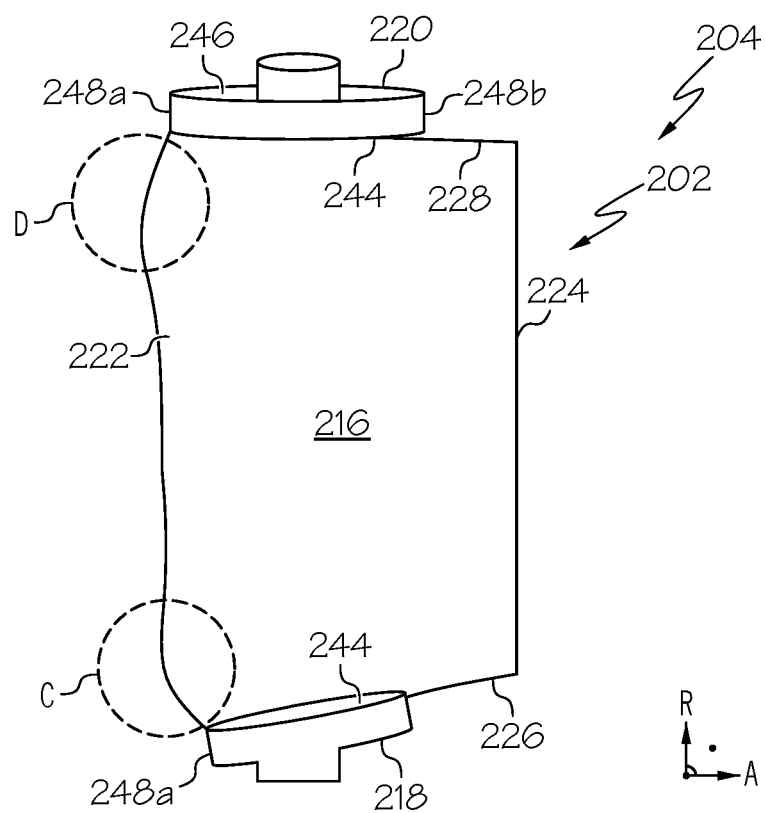
FIG. 6C is a meridional view of a variable stator vane with a local forward swept leading edge at the airfoil root in the hub region and a local aft swept leading edge at the airfoil tip in the shroud region according to additional exemplary embodiments of the present invention.
Figure 7:
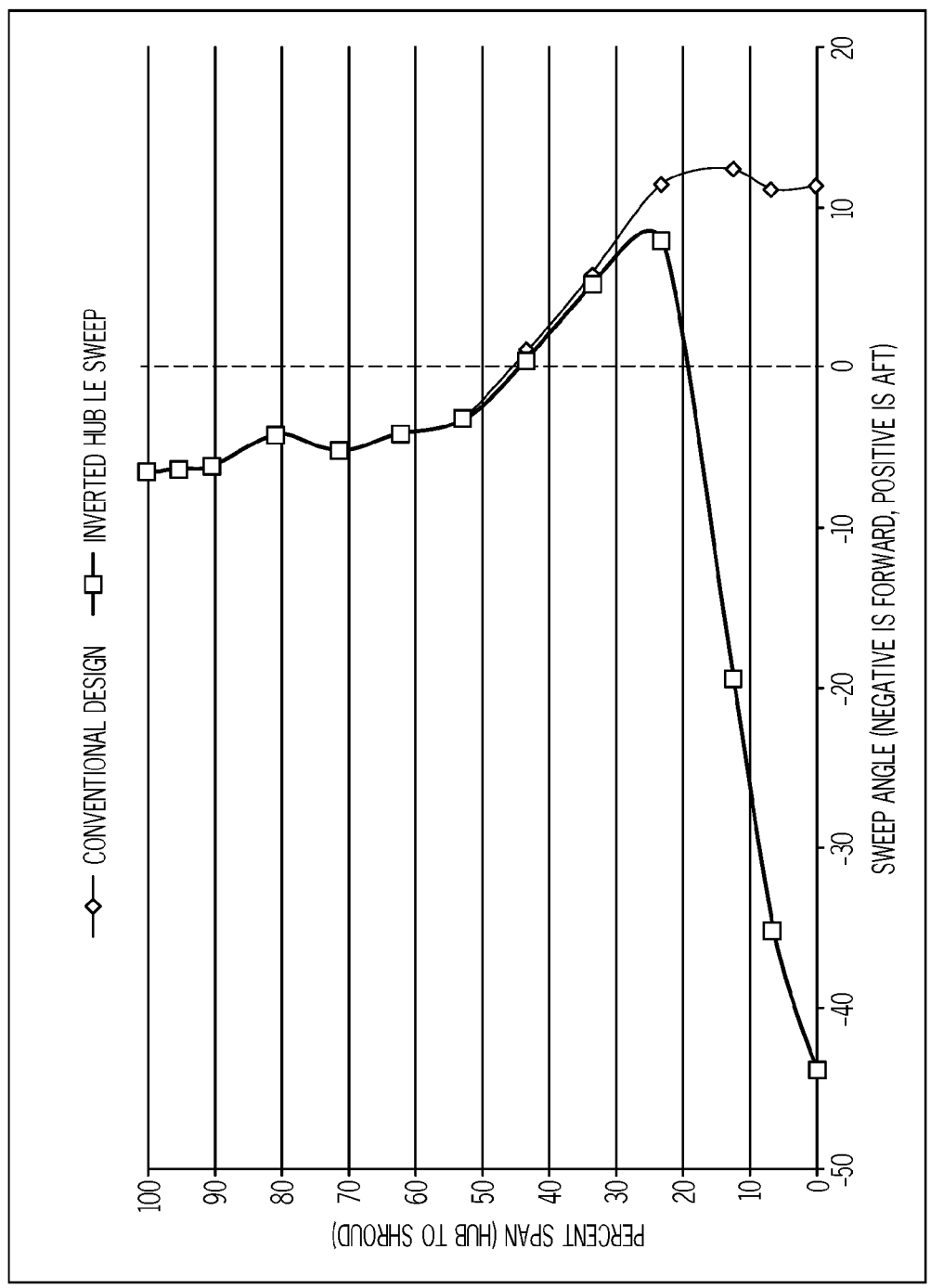
FIG. 7 compares exemplary forward sweep angles at the root for the variable stator vane of FIGS. 5A through 6A according to exemplary embodiments of the present invention with exemplary aft sweep angles at the root for the conventional variable stator vane of FIGS. 1A and 1B.

Referring now to FIG. 6B, in an alternative embodiment, a local aft sweep (encircled region D) may be at the airfoil tip 228 forming a local aft swept leading edge thereat, in which case the button forward edge portion 248a of the outer button 220 is substantially coextensive with the local aft swept leading edge such that the button forward edge portion 248a of the outer button 220 substantially covers the leading edge tip 228 of the variable stator vane 202, thereby substantially eliminating a leading edge outer endwall gap (as previously described) between the airfoil tip 228 and the shroud 118. The sweep offset of the local aft sweep at the tip in the shroud region (encircled region D) may be about 15° or greater, i.e., the change or difference in sweep angles at 100% blade span relative to 75% blade span is 15° or greater.

Referring now to 6C, in accordance with yet another alternative embodiment, the local forward sweep may be at the root (encircled region C) and the local aft sweep at the tip (encircled region D), in the hub and shroud regions respectively. As previously described, the sweep offset of the local forward sweep at the root may be −15° or less and the sweep offset of the local aft sweep at the tip may be 15° or greater. When the local forward sweep is at the root 226 and the local aft sweep is at the tip 228, the button forward edge of both the inner and outer buttons 218 and 220 is substantially coextensive with the locally swept leading edge at both the root and the tip to substantially cover the leading edge of the airfoil of the variable stator vane at both the root and tip, respectively, thereby substantially eliminating the leading edge inner and outer endwall gaps.

Referring again to FIGS. 4A through 6C, the local forward sweep at the root in the hub region (encircled region C) may extend from 0 up to about 25% of the blade span and the local aft sweep at the tip in the shroud region (encircled region D) may extend from about 75% up to about 100% of the blade span. As used herein, the term "up to" means that the local forward sweep may extend from the root (0%) to a first blade span location on the leading edge that is 25% blade span or less and the local aft sweep may extend from a second blade location on the leading edge that is 75% blade span or more to the tip (100% blade span). The sweep of the portion of the leading edge between 25% and 75% blade span may be optimized as known to one skilled in the art.

The improved coverage of the leading edge of the variable stator vanes 202 in the variable stator vane assemblies 204 by one or both of the inner and outer buttons substantially eliminates one or both of the leading edge inner and outer endwall gaps, thereby minimizing leading edge endwall leakage. With less leading edge endwall leakage, aerodynamic losses are reduced, and mechanical performance and compressor efficiency are improved.

From the foregoing, it is to be appreciated that variable stator vane assemblies and variable stator vanes thereof having a local swept leading edge and methods for minimizing endwall leakage therewith are provided. The locally swept leading edge(s) are substantially coextensive with a button forward edge of one or both of the inner and outer buttons. By inverting the stator vane leading edge sweep in a local region toward the hub, shroud, or both the hub and shroud with a sweep offset, while maintaining the inner and outer buttons centered about the rotational axis such that the locally swept leading edge is substantially coextensive with the button forward edge, the inner and/or outer diameter leading edge of the airfoil is substantially covered. Endwall losses due to leakage flow at the leading edge inner and outer endwall gaps are minimized where loading is heaviest and flowfield disturbances between the vanes and the endwall of the flow passageway may occur, thereby reducing aerodynamic losses and improving compressor efficiency relative to conventional variable stator vanes with an aft or neutral swept leading edge toward the hub and forward sweep angles toward the tip and to conventional variable stator vane assemblies in which the rotational axis and/or inner and outer buttons have been moved forward. The locally swept leading edge of the airfoil of the variable stator vane(s) in the hub region, the shroud region, or both, allows more complete coverage of the endwall(s) while simultaneously limiting the size of the leading edge endwall gaps and balancing the leading edge endwall gaps with the trailing edge endwall gaps so that unbalanced overhangs and flow disturbances are avoided. The sweep offset of the leading edge sweep at the root, the tip, or both, also contributes to such results.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A variable stator vane comprising:
   an airfoil disposed between spaced apart inner and outer buttons centered about a rotational axis, the inner and outer buttons each having a button forward edge portion and the airfoil including leading and trailing edges, pressure and suction sides, and a root and a tip; and
   wherein:
   the leading edge, at least a portion of which extends forward of the buttons, includes a local forward sweep at the root, thereby forming a locally swept root of the leading edge thereat; and
   the button forward edge portion of the inner button is substantially vertically aligned with the locally swept leading edge root thereat.

2. The variable stator vane of claim 1, wherein the leading edge of the airfoil includes the local forward sweep at the root of the airfoil in a hub region of a compressor in a gas turbine engine.

3. The variable stator vane of claim 1, wherein the button forward edge portion of the inner button substantially covers the leading edge of the airfoil at the root.

4. The variable stator vane of claim 1, wherein a sweep offset of the local forward sweep is −15° or less to minimize a leading edge endwall gap at the root.

5. The variable stator vane of claim 1, wherein the local forward sweep at the root extends from 0 up to 25% of the blade span to minimize leading edge endwall gaps at the root.

6. The variable stator vane of claim 1, wherein the button forward edge portion of the inner button is spaced apart from the leading edge at the tip.

7. A variable stator vane assembly comprising:
   an inner and an outer button spaced apart and centered about a rotational axis, each of the inner and outer buttons having an edge circumscribed about the rotational axis at a button radius, the edge comprising a button forward edge portion and a button aft edge portion;
   at least one annular row of variable stator vanes, each variable stator vane in the at least one annular row comprising:
      an airfoil disposed between the spaced apart inner and outer buttons, the airfoil including leading and trailing edges, pressure and suction sides, and a root and a tip; and
      wherein the leading edge, at least a portion of which extends forward of the buttons, of the airfoil includes a local forward sweep at the root, thereby forming a locally swept root of the leading edge, and the button forward edge portion of the inner button is substantially vertically aligned with the locally swept leading edge root thereat.

8. The variable stator vane assembly of claim 7, wherein, for each variable stator vane in the at least one annular row, the leading edge of the airfoil includes the local forward sweep at the root of the airfoil in a hub region of a compressor in a gas turbine engine.

9. The variable stator vane assembly of claim 7, wherein, for each variable stator vane in the at least one annular row, the button forward edge portion of the inner button substantially covers the leading edge of the airfoil at the root.

10. The variable stator vane assembly of claim 7, wherein, for each variable stator vane in the at least one annular row, the local forward sweep at the root extends from 0 up to 25% of the blade span.

11. The variable stator vane assembly of claim 7, wherein, for each variable stator vane in the at least one annular row, a sweep offset of the local forward sweep is −15° or less to minimize leading edge endwall gaps at the root.

12. A method for minimizing endwall leakage in a variable stator vane assembly, the method comprising:
   providing a variable stator vane for the variable stator vane assembly having spaced apart inner and outer buttons centered about a rotational axis, the variable stator vane comprising an airfoil including leading and trailing edges, pressure and suction sides, and a root and a tip, the leading edge, at least a portion thereof which extends forward of the buttons, including a local forward sweep at the root with a sweep offset of −15° or less, thereby forming a locally swept root of the leading edge to minimize leading edge endwall gaps at the root; and
   disposing the variable stator vane between the spaced apart inner and outer buttons, the inner and outer buttons each having a button forward edge portion, the variable stator vane being disposed such that the button forward edge portion of the inner button is substantially vertically aligned with the locally swept leading edge at the root.

13. The method of claim 12, wherein the step of providing the variable stator vane comprises providing the leading edge of the airfoil with the local forward sweep at the root of the airfoil in a hub region of a compressor in a gas turbine engine.

14. The method of claim 12, wherein providing the variable stator vane for the variable stator vane assembly further comprises providing the local forward sweep at the root from 0 up to 25% of the blade span to minimize the leading edge endwall gaps at the root.

* * * * *